US010191267B2

United States Patent
Endo et al.

(10) Patent No.: US 10,191,267 B2
(45) Date of Patent: Jan. 29, 2019

(54) MICROSCOPE SYSTEM

(71) Applicant: OLYMPUS CORPORATION, Hachioji-shi, Tokyo (JP)

(72) Inventors: Hideaki Endo, Hino (JP); Hiroshi Watanabe, Hino (JP)

(73) Assignee: OLYMPUS CORPORATION, Tokyo (JP)

( * ) Notice: Subject to any disclaimer, the term of this patent is extended or adjusted under 35 U.S.C. 154(b) by 40 days.

(21) Appl. No.: 15/192,836

(22) Filed: Jun. 24, 2016

(65) Prior Publication Data

US 2017/0003487 A1 Jan. 5, 2017

(30) Foreign Application Priority Data

Jun. 30, 2015 (JP) .................. 2015-131732

(51) Int. Cl.
*G02B 21/08* (2006.01)
*G02B 21/06* (2006.01)
(Continued)

(52) U.S. Cl.
CPC ............. *G02B 21/08* (2013.01); *G02B 21/06* (2013.01); *G02B 21/241* (2013.01); *G02B 21/26* (2013.01);
(Continued)

(58) Field of Classification Search
CPC ....... G02B 21/08–21/088; G02B 21/10; G02B 21/12; G02B 21/125; G02B 21/14;
(Continued)

(56) References Cited

U.S. PATENT DOCUMENTS 6,665,060 B1 12/2003 Zahniser et al.
8,369,010 B2 2/2013 Karasawa et al.
(Continued)

FOREIGN PATENT DOCUMENTS

JP 08234273 A 9/1996
JP 2004273522 A 9/2004
(Continued)

OTHER PUBLICATIONS

A. Nagano, "Optical apparatus", JPH08234273A, machine translation.*

(Continued)

*Primary Examiner* — Bumsuk Won
*Assistant Examiner* — Wen Huang
(74) *Attorney, Agent, or Firm* — Holtz, Holtz & Volek PC

(57) ABSTRACT

A microscope system includes: a stage on which a specimen is placed; a light emitting LED configured to emit illumination light for illuminating the specimen; an optical system configured to condense the illumination light emitted by the light emitting LED and irradiate the specimen with the illumination light; an input unit configured to receive an input of a light control signal that adjusts a light amount of the light emitting LED; and a control unit configured to control, when the light control signal is input from the input unit, the light amount of the light emitting LED to become a light amount according to the light control signal by delaying the light control signal by a predetermined time from timing when the light control signal is input.

10 Claims, 12 Drawing Sheets

(51) Int. Cl.
*G02B 21/24* (2006.01)
*G02B 21/26* (2006.01)
*G02B 21/36* (2006.01)
*H05B 33/08* (2006.01)
*H05B 37/02* (2006.01)

(52) U.S. Cl.
CPC ....... *G02B 21/365* (2013.01); *H05B 33/0845* (2013.01); *H05B 37/0281* (2013.01)

(58) Field of Classification Search
CPC ...... G02B 21/06; G02B 21/241; G02B 21/26; G02B 21/365; H05B 33/0845; H05B 37/0281
USPC .......................................... 359/385; 362/276
See application file for complete search history.

(56) References Cited

U.S. PATENT DOCUMENTS

2008/0278707 A1* 11/2008 Zahniser ................. G01N 1/30
                                                    356/39
2011/0058253 A1    3/2011 Karasawa et al.
2013/0257707 A1   10/2013 Matsumura
2015/0290285 A1* 10/2015 Nussinovitch ....... A61K 48/005
                                                    604/20

FOREIGN PATENT DOCUMENTS

| JP | 2005250151 A | 9/2005 |
| JP | 2013229560 A | 11/2013 |
| WO | 2010027000 A1 | 3/2010 |
| WO | 2013131062 A1 | 9/2013 |

OTHER PUBLICATIONS

Extended European Search Report (EESR) dated Nov. 18, 2016 issued in counterpart European Application No. 16176793.4.

Japanese Office Action dated Nov. 13, 2018 (and English translation thereof) issued in counterpart Japanese Application No. 2015-131732.

* cited by examiner

7 TO 8 mm

2 TO 3 mm

| N | P |
|---|---|
| 0 | 0 |
| 1 | 10 |
| 2 | 20 |
| 3 | 30 |
| ⋮ | ⋮ |
| 254 | 2540 |
| 255 | 2550 |

T1

| N | P |
|---|---|
| 0 | 0 |
| 1 | 1 |
| 2 | 4 |
| 3 | 9 |
| ⋮ | ⋮ |
| 254 | 64516 |
| 255 | 65025 |

| MAGNIFICATION OF OBJECTIVE LENS | TYPE OF CUBE | LIGHT CONTROL VALUE N |
|---|---|---|
| 50 | 2 | 100 |
| 100 | 4 | 50 |
| ⋮ | ⋮ | ⋮ |
| 10 | 1 | 200 |

T3

MICROSCOPE SYSTEM

CROSS REFERENCE TO RELATED APPLICATIONS

This application is based upon and claims the benefit of priority from Japanese Patent Application No, 2015-131732, filed on Jun. 30, 2015, the entire contents of which are incorporated herein by reference.

BACKGROUND

1. Technical Field

The present disclosure relates to a microscope system that observes a specimen placed on a stage.

2. Related Art

In the past, microscope systems irradiate a specimen with illumination light using a halogen lamp as a light source. However, color temperature of the halogen lamp is changed due to light control, and thus there is a problem that the color of a field is changed. Therefore, in recent years, a technology for irradiating a specimen with illumination light using a light emitting diode (LED), the color temperature of which is rarely changed, as a light source is known (see JP 2005-250151 A). This technology achieves improvement of operability of at the time of observation by automatically controlling a light amount of the LED based on a state of an observation optical path in which the specimen is observed and a light control signal input from a light control volume switch.

However, in JP 2005-250151 A, the light amount is instantly switched to the light amount according to the light control signal input from the light control volume switch. Therefore, there is a problem of a rapid increase in the light amount despite the intention of an observer in a case where a light control volume is set more than necessary at the time of power-up. In this case, there is not an enough time required for avoidance behavior of the observer to look aside from an eyepiece or for light reflex. Therefore, prevention of the rapid increase in the light amount has been demanded.

There is a need for a microscope system that can prevent a rapid increase in a light amount despite the intension of an observer.

SUMMARY

In accordance with some embodiments, a microscope system that can prevent a rapid increase in a light amount despite the intension of an observer is presented.

A microscope system includes: a stage on which a specimen is placed; a light emitting LED configured to emit illumination light for illuminating the specimen; an optical system configured to condense the illumination light emitted by the light emitting LED and irradiate the specimen with the illumination light; an input unit configured to receive an input of a light control signal that adjusts a light amount of the light emitting LED; and a control unit configured to control, when the light control signal is input from the input unit, the light amount of the light emitting LED to become a light amount according to the light control signal by delaying the light control signal by a predetermined time from timing when the light control signal is input.

The above and other features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 16 is a diagram illustrating an example of a reproduction mode setting table stored in a reproduction mode setting table storage unit according to the fourth embodiment of the present disclosure.

DETAILED DESCRIPTION

Figure 1:
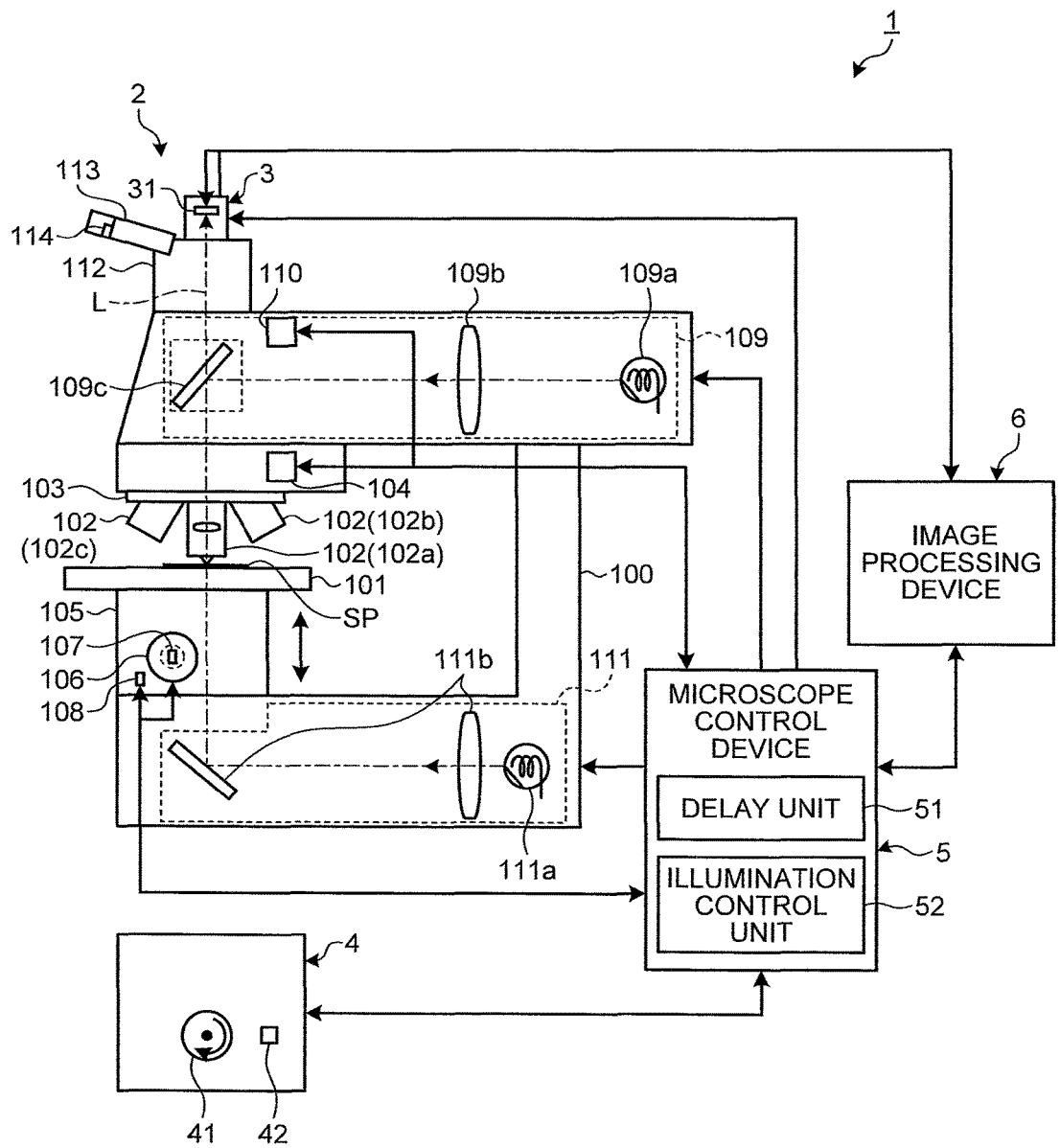
FIG. 1 is a schematic view illustrating a schematic configuration of a microscope system according to a first embodiment of the present disclosure.

Hereinafter, forms for implementing the present disclosure (hereinafter, referred to as "embodiments) will be described with reference to the drawings. Note that the present disclosure is not limited by the embodiments described below. Further, the drawings referred to in the description below merely schematically illustrate shapes, sizes, and positional relationships to the extent that the content of the present disclosure can be understood. That is, the present disclosure is not limited to the shapes, the sizes, and the positional relationships exemplarily illustrated in the drawings.

First Embodiment

Configuration of Microscope System

FIG. 1 is a schematic diagram illustrating a schematic configuration of a microscope system according to a first embodiment of the present disclosure. In FIG. 1, description will be given where a plane on which a microscope system 1 is placed is an XY plane, and a direction perpendicular to the XY plane is a Z direction.

The microscope system 1 illustrated in FIG. 1 includes a microscope device 2 that observes a specimen SF, an imaging device 3 that images the specimen SP through the microscope device 2, and generates image data of the specimen SP, an operation device 4 that receives an input of a light control signal that instructs a light control value of illumination of the microscope device 2, a microscope control device 5 that controls the microscope device 2, and an image processing device 6 that displays an image corresponding to the image data generated by the imaging device 3. The microscope device 2, the imaging device 3, the operation device 4, and the image processing device 6 are communicatively connected by wired or wireless means.

Configuration of Microscope Device

First, a configuration of the microscope device 2 will be described.

The microscope device 2 includes an approximately C-shaped main body unit 100, a stage 101 on which the specimen SF is placed, objective lenses 102 arranged to face the stage 101, a revolver 103 that holds a plurality the objective lenses 102 having different magnifications, a revolver detection unit 104 that detects a type (magnification) of the objective lens 102 placed on an observation optical path L, a focusing unit 105 that moves the stage 101 in a perpendicular direction (Z axis direction) perpendicular to a placing surface on which the specimen SP is placed to adjust the distance between the stage 101 and the objective lens 102, a focusing operation unit 106 that moves the focusing unit 105 in an up and down direction, a touch sensor 107 that detects an object that touches the focusing operation unit 106, a proximity sensor 108 that detects an object coming close to the focusing operation unit 106, an epi-illumination optical unit 109 that irradiates the specimen SP with light, a cube position sensor 110 that detects a type of a code cube arranged on the observation optical path L, a transmitted-light illumination optical unit 111 that irradiates the specimen SP with light, a trinocular tube unit 112 attached to the main body unit 100, an eyepiece 113 attached through the trinocular tube unit 112, and a proximity sensor 114 that detects an object coming close to the eyepiece 113.

The stage 101 is freely movable in a horizontal direction on the XY plane, and is provided to the main body unit 100 through the focusing unit 105.

As the objective lens 102, a plurality of objective lenses having mutually different magnifications (for example, an objective lens 102a of 10 times, an objective lens 102b of 50 times, and an objective lens 102c of 100 times) are freely detachably attached to the revolver 103.

The revolver 103 is freely rotatably provided to the main body unit 100, and arranges the objective lens 102 above the specimen SP. The revolver 103 is rotated to selectively switch the objective lens 102 to be used for an observation of the specimen SP placed on the observation optical path L, thereby to change the magnification of an image in a field.

The revolver detection unit 104 acquires identification information indicating the magnification or the type, which is provided to the objective lens 102, and outputs the identification information to the microscope control device 5.

The focusing unit 105 is movable in the perpendicular direction perpendicular to the placing surface on which the specimen SP is placed, and adjusts the distance between the objective lens 102 and the stage 101. To be specific, the focusing unit 105 relatively moves the stage 101 in the perpendicular direction (Z direction) perpendicular to the placing surface on which the specimen SP is placed, with respect to the objective lens 102. The focusing unit 105 moves the stage 101 in the up and down direction according to an operation of the focusing operation unit 106. The stage 101 is freely detachably connected to the focusing unit 105.

The focusing operation unit 106 moves the focusing unit 105 in the perpendicular direction according to an operation from an outside. To be specific, the focusing operation unit 106 relatively moves the focusing unit 105 in the perpendicular direction (Z direction) perpendicular to the placing surface on which the specimen SP is placed, with respect to the stage 101. In more detail, the focusing operation unit 106 is rotatably provided around a predetermined axis and is rotated by an observer to relatively move the focusing unit 105 in the Z direction with respect to the stage 101.

The touch sensor 107 detects contact of an object with the focusing operation unit 106, and outputs a detection result thereof to the microscope control device 5. The touch sensor 107 is configured using a contact sensor and the like.

The proximity sensor 108 detects proximity of an object to the focusing operation unit 106, and outputs a detection result thereof to the microscope control device 5. The proximity sensor 108 is configured using a near infrared sensor that performs irradiation with near infrared light and the like.

The epi-illumination optical unit 109 includes an epi-illumination light source 109a that emits epi-illumination light, an epi-illumination optical system 109b that condenses the epi-illumination light emitted by the epi-illumination light source 109a, and a cube 109c including various epi-illumination optical members that condense the epi-illumination light emitted by the epi-illumination light source 109a and guide the light in a direction of the observation optical path L.

The epi-illumination light source 109a is configured using a light emitting diode (LED) lamp. The epi-illumination light source 109a emits the light with a predetermined light amount under control of the microscope control device 5.

The epi-illumination optical system 109b is configured using a condenser lens and a collimate lens, and condense the epi-illumination light emitted by the epi-illumination light source 109a and guides the epi-illumination light to the cube 109c.

The cube 109c is freely rotatably provided to the main body unit 100, and a plurality of the cubes 109c in which a half-mirror, a filter unit, a stop, an aperture stop, and the like are housed is arranged on the observation optical path L.

The cube position sensor 110 detects a type of the cube 109c arranged on the observation optical path L, and outputs a detection result thereof to the microscope control device 5.

The transmitted-light illumination optical unit 111 includes a transmitted-light illumination light source 111a that emits transmitted-light illumination light, and various transmitted-light illumination optical systems 111b that condense the transmitted-light illumination light emitted by the transmitted-light illumination light source 111a and guide the transmitted-light illumination light in the direction of the observation optical path. L.

The transmitted-light illumination light source 111a is configured using an LED lamp. The transmitted-light illumination light source 111a emits the light with a predetermined light amount under control of the microscope control device 5. Note that, in the first embodiment, the epi-illumination light source 109a and the transmitted-light illumination light source 111a function as light emitting LEDs.

The transmitted-light illumination optical systems 111b are configured using a condenser lens, a collimate lens, a mirror, and the like, and condense the light emitted by the transmitted-light illumination light source 111a and reflect the light onto the observation optical path L.

The trinocular tube unit 112 guides observation light of the specimen SP incident from the objective lens 102 to the imaging device 3 and the eyepiece 113.

The eyepiece 113 is used by the observer to observe the specimen SP. The eyepiece 113 is configured using a plurality of lenses that focuses an observation image of the specimen SP.

The proximity sensor 114 detects proximity of an object to the eyepiece 113, and outputs a detection result thereof to the microscope control device 5. The proximity sensor 114 is configured using a near infrared sensor that performs irradiation with near infrared light and the like.

Configuration of Imaging Device

Next, a configuration of the imaging device 3 will be described.

The imaging device 3 is configured using an imaging element 31 such as a charge coupled device (COD) or a complementary metal oxide semiconductor (CMOS), which includes a plurality of pixels that receives the observation image (observation light) of the specimen SP incident through the objective lens 102 and the trinocular tube unit 112 and performs photoelectric conversion thereby to convert the observation light into an electrical signal (analog signal), and a signal processing unit (not illustrated) that applies signal processing such as amplification (gain adjustment) to the electrical signal output from the imaging element 31 and then performs A/D conversion thereby to convert the electrical signal into digital image data of the specimen SP and output the digital image data to the image processing device 6. The imaging device 3 sequentially generates the image data of the specimen SP at short time intervals under control of the microscope control device 5 and outputs image data to the image processing device 6. Further, the imaging device 3 generates the image data at a predetermined frame rate, for example, 15 fps.

Operation Device

Next, the operation device 4 will be described.

The operation device 4 receives inputs of the light control signals that indicate respective amounts of emitted light of the epi-illumination light source 109a and the transmitted-light illumination light source 111a of the microscope device 2. The operation device 4 is rotatable around a predetermined axis, and includes a volume operation unit 41 that receives the inputs of the light control signals, and an illumination switching switch 42 that receives an input of an instruction signal that instructs lighting of one of the epi-illumination light source 109a and the transmitted-light illumination light source 111a. Note that the operation device 4 is configured using a switch and the like. However, the operation device 4 may be configured using a touch panel, a joystick, or the like. Note that, in the first embodiment, the operation device 4 functions as an input unit.

Configuration of Microscope Control Device

Next, a configuration of the microscope control device 5 will be described.

The microscope control device 5 collectively controls operations of the units that configure the microscope device 2. Further, the microscope control device 5 causes the imaging device 3 to perform imaging at predetermined timing. Further, when the light control signal from the operation device 4 is input, the microscope control device 5 controls the light amount of the epi-illumination light source 109a or the transmitted-light illumination light source 111a to become a light amount according to the light control signal by delaying the light control signal by a predetermined time from the timing when the light control signal is input. The microscope control device 5 is configured using a central processing unit (CPU) and the like.

Here, a detailed configuration of the microscope control device 5 will be described. The microscope control device 5 includes at least a delay unit 51 and an illumination control unit 52.

The delay unit 51 delays the light control signal input from the operation device 4 by a predetermined time, and outputs the signal to the illumination control unit 52.

Figure 2:
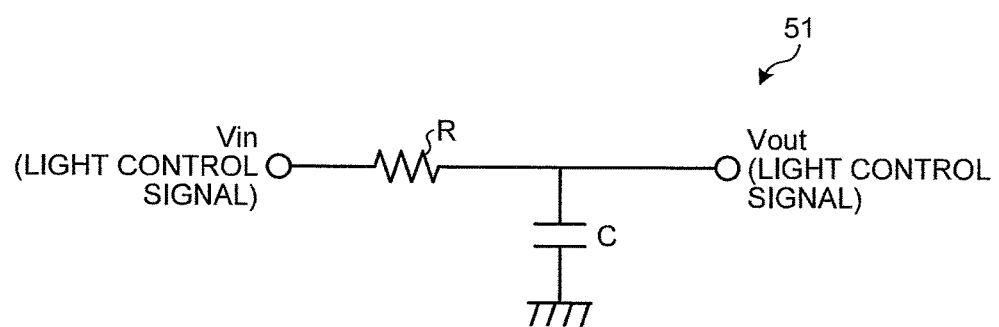
FIG. 2 is a diagram schematically illustrating a circuit configuration of a delay unit according to the first embodiment of the present disclosure.

FIG. 2 is a circuit diagram illustrating the configuration of the delay unit 51. As illustrated in FIG. 2, the delay unit 51 is configured using a low-pass filter that attenuates a higher frequency component than a predetermined frequency in the light control signal. To be specific, the delay unit 51 is a primary low-pass filter including capacitors C arranged in parallel in wiring that propagates the light control signal input from the operation device 4, and a resistance R arranged in series with the wiring that propagates the light control signal. Note that the low-pass filter may be configured using variable resistance in place of the resistance R. The delay unit 51 outputs, to the illumination control unit 52 (Vout), a light control signal (Vout) obtained by applying low-pass processing to the pulse light control signal (Vin) input from the operation device 4 in order to delay the light control signal by a predetermined time from the timing when the light control signal is input from the operation device 4.

The illumination control unit 52 emits the epi-illumination light source 109a or the transmitted-light illumination light source 111a with a predetermined light amount according to the light control signal input from the delay unit 51.

Configuration of Processing Device

Next, a configuration of the image processing device 6 will be described.

The image processing device 6 is configured using a personal computer. The image processing device 6 applies predetermined image processing to a plurality of image data generated by the imaging device 3 and displays the image data, and stores the image data. Further, the image processing device 6 receives inputs of instruction signals that instruct various operations related to the microscope system 1.

Figure 3:
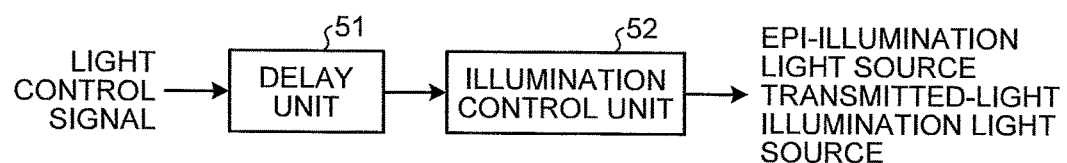
FIG. 3 is a diagram schematically illustrating a flow of a light control signal input from an operation device according to the first embodiment of the present disclosure.

The microscope system 1 configured as described above observes the specimen SP placed on the stage 101 through the eyepiece 113 after a power supply of the microscope system 1 is started by an observer. In this case, when the observer operates the operation device 4 to increase the light amount of the epi-illumination light source 109a or the transmitted-light illumination light source 111a, a stress may be applied to the eye due to a rapid increase in the light amount despite the intention of the observer. Therefore, as illustrated in FIG. 3, the delay unit 51 performs the light control by outputting the light control signal to the illumination control unit 52 by delaying the light control signal by the predetermined time from timing when the light control signal is input by delaying the light control signal input from the operation device 4.

Principle of Time Setting of Light Control Value by Delay Unit

Figure 4:
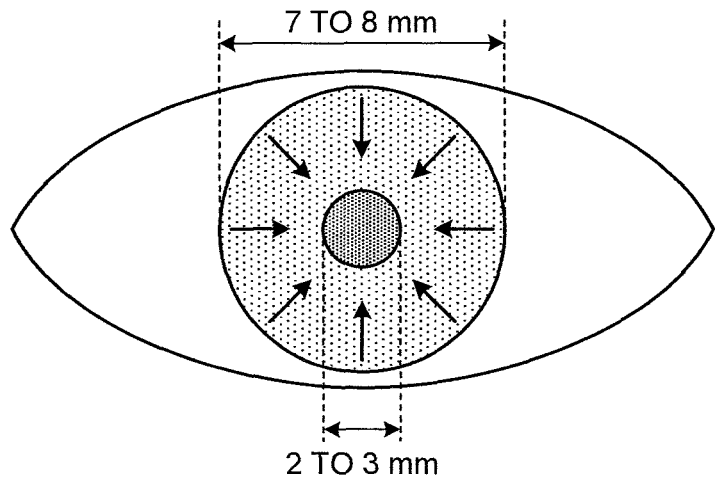
FIG. 4 is a diagram schematically illustrating a pupil of a person.
Figure 5:
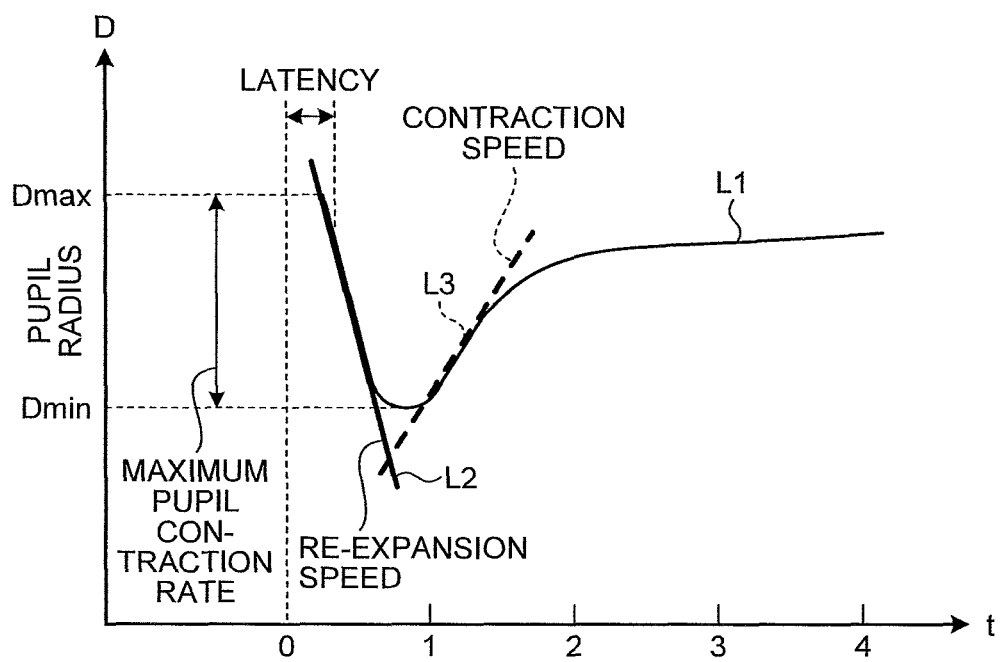
FIG. 5 is a diagram schematically illustrating change of a pupil radius at the time of light reflex when flashlight is incident on an eye.
Figure 6:
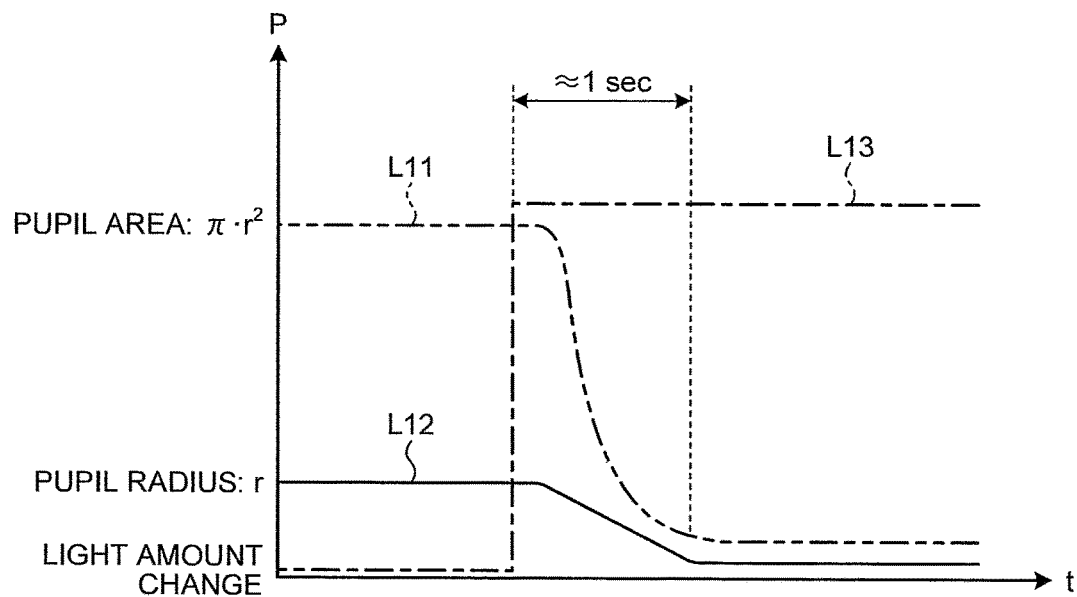
FIG. 6 is a diagram schematically illustrating a relationship between a pupil radius and a pupil area of when excessive light is sequentially incident on an eye.

Next, the time delayed by the delay unit 51 will be described in detail. FIG. 4 is a diagram schematically illustrating a pupil of a person. FIG. 5 is a diagram schematically illustrating change of a pupil radius at the time of light reflex of when flashlight is incident on the eye. FIG. 6 is a diagram schematically illustrating a relationship between the pupil radius and a pupil area of when excessive light is sequentially incident on the eye. In FIG. 5, the horizontal axis represents a time (sec), and the vertical axis represents a pupil radius D. Further, in FIG. 6, the horizontal axis represents a time (sec), and the vertical axis represents a value P of the light amount, a pupil area $n \times r^2$, and a pupil radius r. Further, in FIG. 5, the curved line L1 illustrates the pupil radius, the straight line 12 illustrates a contraction speed of the pupil, and the straight line L3 illustrates a re-expansion speed of when the pupil that has once contracted expands again. Further, in FIG. 6, the curved line L11 illustrates change of the pupil area, the curved line L12 illustrates change of the pupil radius, and the polygonal line L13 illustrates change of the light amount.

As illustrated in FIG. 4, a diameter 2r of the pupil of the person is changed from 7 to 8 mm at the maximum to 2 to 3 mm at the minimum (decreased by up to ¼ of at the time of enlargement) (see Dmax to Dmin of FIG. 5) according to the light amount. Hereinafter, this phenomenon is referred to as light reflex movement. An incident light amount is proportional to the area of the pupil, and thus can be suppressed to about 1/16 when the light amount to a retina is 1 at the maximum.

As illustrated in FIGS. 5 and 6, when the flashlight is incident on the eye, contraction (light reflex movement) of the pupil of the person due to photic stimulation is minimized to about one second including a reaction delay (latency) after incidence of the excessive light amount (see the straight line L2), and then, the pupil expands (see the straight line L3). An increase in the light amount faster than the contraction of the pupil is led to an increase in the incident light amount to the retina, and thus the person feels too bright. Therefore, the rapid increase in the light amount is performed in one second or more, so that the light reflex catches up with the increase. Therefore, the person does not feel too bright more than necessary. In addition, the observer operates the volume operation unit 41 of the operation device 4, thereby to secure a time to perform operation to put the light control signal (light control volume) back. Therefore, the increase in the light amount can be avoided.

Therefore, as illustrated in FIGS. 2 and 3, the delay unit 51 performs the light control by outputting the light control signal to the illumination control unit 52 by delaying the light control signal by a predetermined time from timing when the light control signal is input by delaying the light control signal input from the operation device 4.

Figure 7:
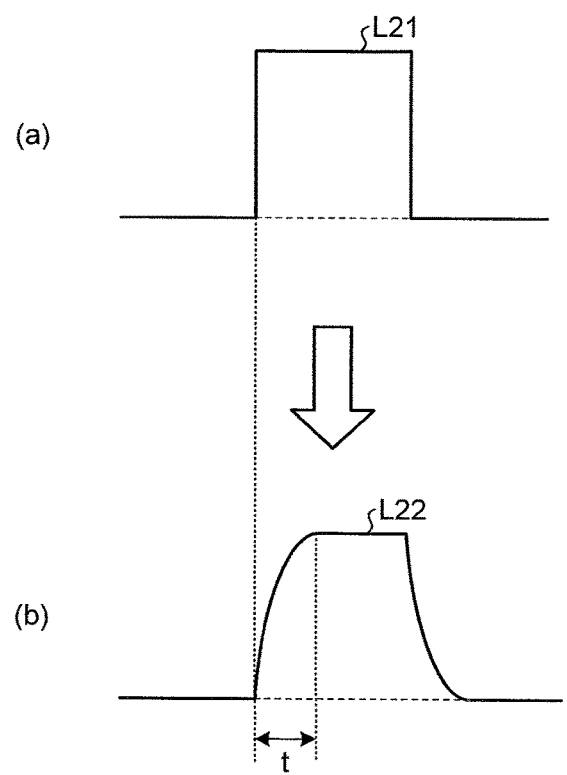
FIG. 7 is a diagram schematically illustrating a light control signal delayed by the delay unit for the light control signal input from the operation device according to the first embodiment of the present disclosure.

FIG. 7 is a diagram schematically illustrating the light control signal delayed by the delay unit 51 for the light control signal from the operation device 4. In FIG. 7, the horizontal axis represents a time, and the vertical axis represents a voltage value. The curved line L21 in (a) of FIG. 7 illustrates the voltage value of the light control signal input from the operation device 4, and the curved line L22 in (b) of FIG. 7 illustrates the voltage value of the light control signal delayed by the delay unit 51 by a predetermined time.

As illustrated in FIG. 7, the delay unit 51 outputs the light control signal to the illumination control unit 52 to delay timing to become a voltage value corresponding to the light control signal by the time t (for example, about one second) by gently increasing the curved line L22 (voltage value) of the light control signal to have a smooth inclination with respect to the curved line L21 (voltage value) of the sharp light control signal input from the operation device 4. Accordingly, an enough time required in the light reflex can be provided. Note that the time to delay is from 0.5 to 3 seconds, favorably from 1 to 2 seconds, and more favorably 1 second.

According to the above-described first embodiment of the present disclosure, the delay unit 51 that delays the light control signal input from the volume operation unit 41 of the operation device 4 by a predetermined time is provided, and the delay time is provided to the voltage value of the light control signal, and the voltage value of the light control signal is gently increased, so that the light control signal is output to the illumination control unit 52 to delay the input timing by the time t (for example, about one second). Therefore, the rapid increase in the light amount despite the intention of the observer can be prevented.

Further, according to the first embodiment of the present disclosure, when the light control signal is input from the volume operation unit 41 of the operation device 4 immediately after the microscope system 1 is powered up, the light amount of the epi-illumination light source 109a or the transmitted-light illumination light source 111a is controlled to become the light amount according to the light control signal after the lapse of a predetermined time. Therefore, when the observer observes the specimen SP while looking into the eyepiece 113 immediately after the startup of the microscope system 1, a rapid increase in the light amount despite the intention of the observer can be prevented.

Note that, in the first embodiment of the present disclosure, the delay unit 51 is configured using the resistance R with a fixed value. However, the delay unit 51 may be configured using a variable resistance with a changeable value according to an input from an outside, for example. Accordingly, the time to delay the light control signal can be changed, or the delay can be instantly reflected to the light control signal.

Second Embodiment

Next, a second embodiment of the present disclosure will be described. A microscope system according to the second embodiment has a different configuration from the first embodiment. To be specific, in the first embodiment, the delay unit 51 that delays the light control signal input from the operation device 4 has been provided. However, the microscope system according to the second embodiment controls a light amount to become a light amount according to a light control signal within a predetermined time (for example, about one second). Therefore, hereinafter, processing executed by the microscope system according to the second embodiment will be described after description of the configuration of the microscope system according to the second embodiment. Note that the same configuration as that of the microscope system 1 according to the first embodiment is denoted with the same reference sign, and description is omitted.

Configuration of Microscope System

Figure 8:
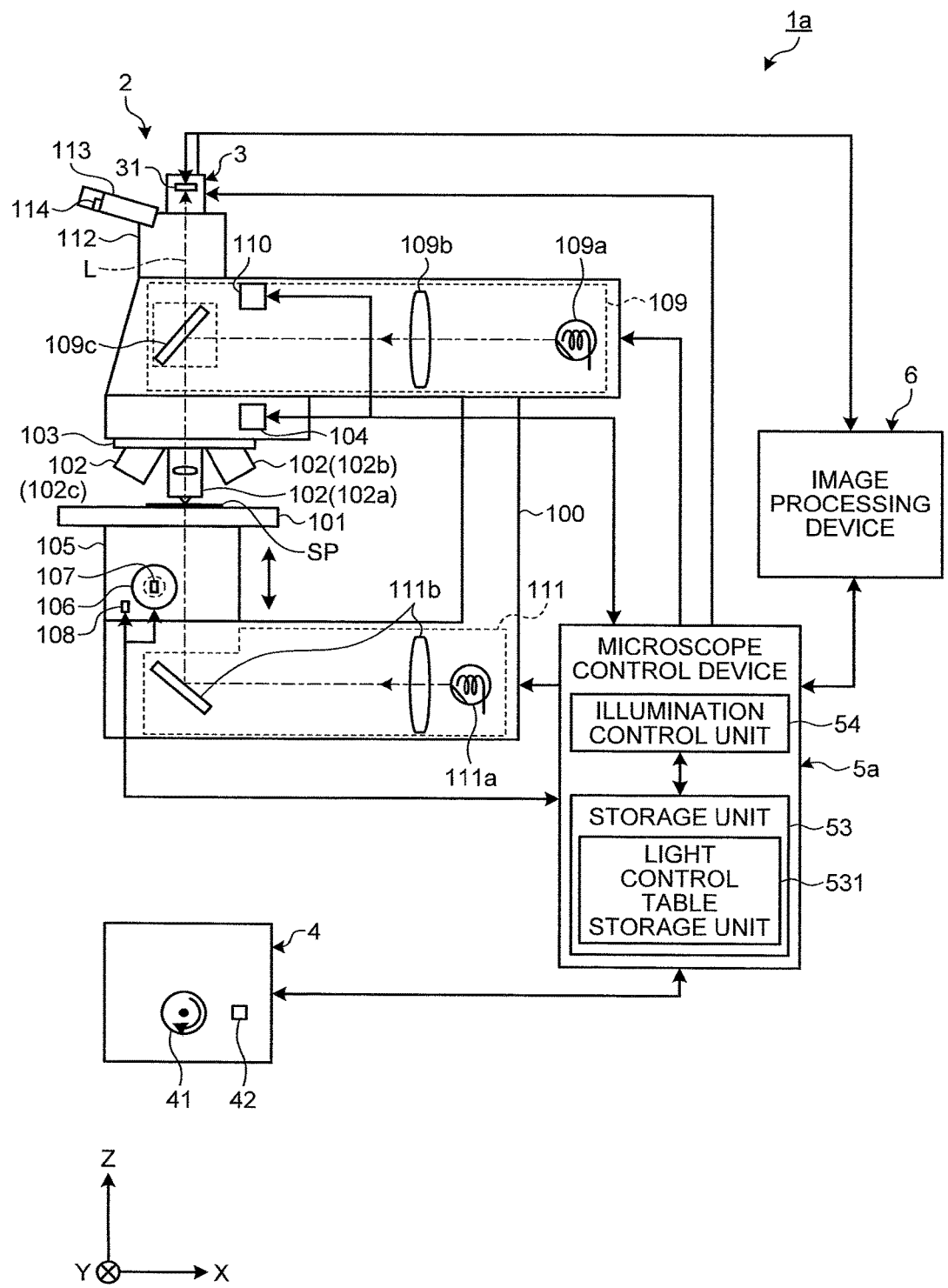
FIG. 8 is a schematic diagram illustrating a schematic configuration of a microscope system according to a second embodiment of the present disclosure.

FIG. 8 is a schematic diagram illustrating schematic configuration of a microscope system according to the second embodiment of the present disclosure. A microscope system 1a illustrated in FIG. 8 includes a microscope control device 5a in place of the microscope control device 5 of the microscope system 1 according to the first embodiment.

The microscope control device 5a collectively controls operations of units that configure a microscope device 2. Further, the microscope control device 5a causes an imaging device 3 to perform imaging at predetermined timing. The microscope control device 5a is configured using a CPU, or the like.

Here, a detailed configuration of the microscope control device 5a will be described. The microscope control device 5a includes a storage unit 53 and an illumination control unit 54.

The storage unit 53 stores various types of information of the microscope system 1a. The storage unit 53 is configured using a flash memory, a synchronous dynamic random access memory (SDRAM), or the like. Further, the storage unit 53 includes a light control table storage unit 531.

Figures 9, 10:
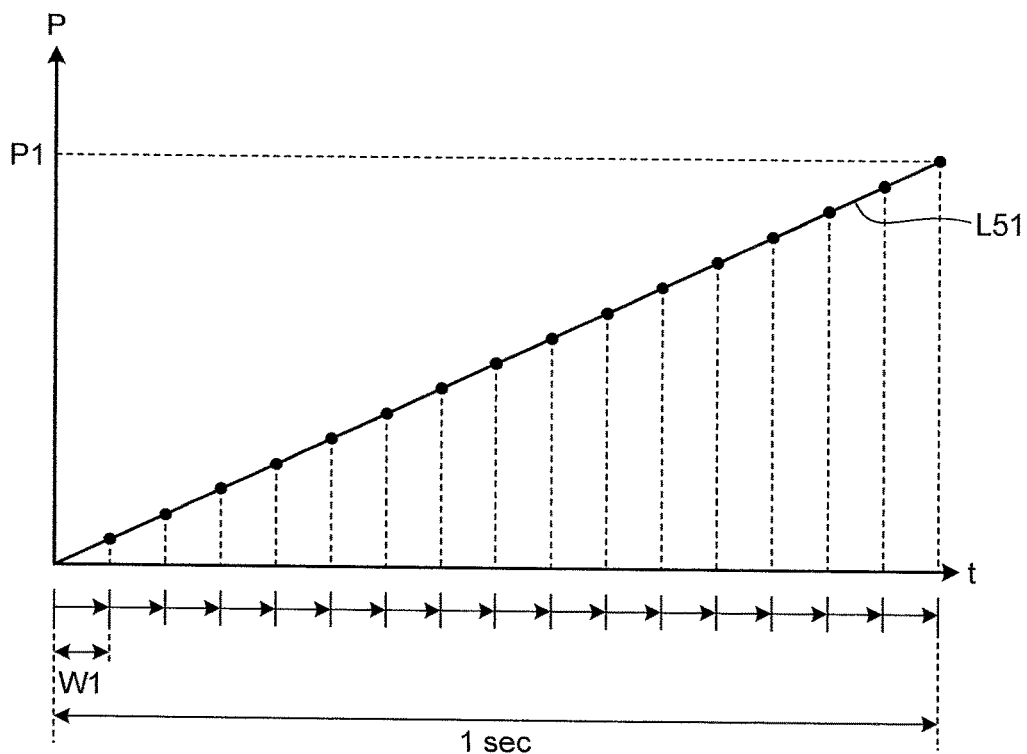
FIG. 9 is a diagram illustrating an example of a light control table stored in a light control table storage unit according to the second embodiment of the present disclosure.
FIG. 10 is a diagram schematically illustrating a light amount of an epi-illumination light source or a transmitted-light illumination light source controlled by an illumination control unit according to the second embodiment of the present disclosure.

The light control table storage unit 531 stores a light control table that indicates a time to be delayed according to the light control signal input from an operation device 4. FIG. 9 is a diagram illustrating an example of the light control table stored in the light control table storage unit 531.

As illustrated in FIG. 9, in a light control table T1, a light amount instruction value P that instructs a light amount of an epi-illumination light source 109a or a transmitted-light illumination light source 111a for a light control signal N input from the operation device 4 is stored. To be specific, in the light control table T1, a value obtained by multiplying the light control signal N input from the operation device 4 by a predetermined constant a (a: an integer) is stored as the light amount instruction value P (P=N×a). For example, in the light control table T1, when the predetermined constant a is "10" in a case where the light control signal N input from the operation device 4 is "3", the light amount instruction value P that instructs the light amount of the epi-illumination light source 109a or the transmitted-light illumination light source 111a is stored as "30" (P=3×10). Note that the predetermined constant a can be appropriately changed.

The illumination control unit 54 refers to the light control table T1 stored in the light control table storage unit 531 and outputs the light amount instruction value according to the light control signal input from the operation device 4 to the epi-illumination light source 109a or the transmitted-light illumination light source 111a. Further, when the light control signal is input from the operation device 4 immediately after the microscope system 1 is started, the illumination control unit 54 refers to the light control table T1 stored in the light control table storage unit 531 and outputs the light amount instruction value according to the light control signal input from the operation device 4 to the epi-illumination light source 109a or the transmitted-light illumination light source 111a. To be specific, when the light control signal is input from the operation device 4, the illumination control unit 54 refers to the light control table T1 stored in the light control table storage unit 531, and changes the light amount of the epi-illumination light source 109a or the transmitted-light illumination light source 111a in a stepwise manner. For example, when the light control signal is input from the operation device 4, the illumination control unit 54 refers to the light control table T1 stored in the light control table storage unit 531, and controls the light amount of the epi-illumination light source 109a or the transmitted-light illumination light source 111a by outputting, at fixed intervals, the light amount instruction value that instructs the light amount of the epi-illumination light source 109a or the transmitted-light illumination light source 111a to become the light amount according to the light control signal within a predetermined time (one second).

Further, the illumination control unit 54 controls the epi-illumination light source 109a or the transmitted-light illumination light source 111a with a current value equivalent to a light control instruction value corresponding to the light control signal (0 to 255 in FIG. 9) input from the operation device 4. In this case, the illumination control unit 54 increases the light amount up to the light amount according to the light control signal in every step from 0 in a stepwise manner. A change time of every step is a predetermined time set in advance. As a guide of the change time, in a case where the light control signal N "255" is input, for example, a time to secure a total change time of 0 to 255 (256 steps) for one second or more, that is, 4 msec/step or more (1000/256) is desirable.

FIG. 10 is a diagram schematically illustrating the light amount of the epi-illumination light source 109a or the transmitted-light illumination light source 111a controlled by the illumination control unit 54. In FIG. 10, the horizontal axis represents a time and the vertical axis represents the light amount instruction value. Further, in FIG. 10, the curved line L51 illustrates the light amount instruction value for the light control light input to the illumination control unit 54 from the operation device 4 immediately after the start of the microscope system 1a.

As illustrated in the curved line L51 of FIG. 10, when the light control signal is input from the operation device 4 immediately after the microscope system 1a is started, the illumination control unit 54 refers to the light control table T1 stored in the light control table storage unit 531, and controls the light amount of the epi-illumination light source 109a or the transmitted-light illumination light source 111a by outputting, at fixed intervals (at intervals of W1), the light amount instruction value that instructs the light amount of the epi-illumination light source 109a or the transmitted-light illumination light source 111a to have a light amount instruction value P1 according to the light control signal input from the operation device 4 within a predetermined time (about one second.). Accordingly, a rapid increase in the light amount despite the intention of an observer can be prevented.

Processing of Microscope System

Figure 11:
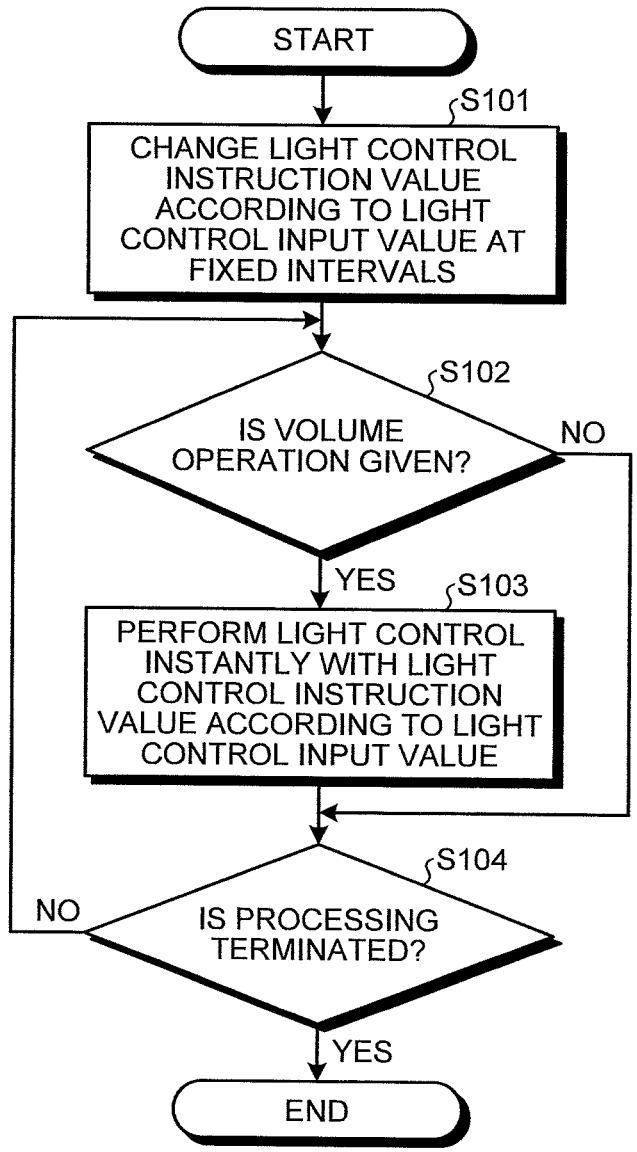
FIG. 11 is a flowchart illustrating an outline of processing executed by the microscope system according to the second embodiment of the present disclosure.

Next, processing executed by the microscope system 1a will be described. FIG. 11 is a flowchart illustrating an outline of processing executed by the microscope system 1a.

As illustrated in FIG. 11 first, the illumination control unit 54 refers to the light control table T1 stored in the light control table storage unit 531, and controls the epi-illumination light source 109a or the transmitted-light illumination light source 111a in a stepwise manner by outputting, at fixed intervals, the light amount instruction value to the epi-illumination light source 109a or the transmitted-light illumination light source 111a while changing the light amount instruction value up to a light control input value input from the operation device 4, to have the light amount according to the light control signal input from the volume operation unit 41 of the operation device 4 within a predetermined time (one second) (step S101). Accordingly, an enough time required in light reflex can be provided. Therefore, a rapid increase in the light amount despite the intention of an observer immediately after the power-up of the microscope system 1a can be prevented.

Next, when a volume operation is given to the volume operation unit 41 of the operation device 4 (Yes in step S102), the illumination control unit 54 instantly controls the epi-illumination light source 109a or the transmitted-light illumination light source 111a by outputting the light amount instruction value corresponding to the light control input value input from the operation device 4 to the epi-illumination light source 109a or the transmitted-light illumination light source 111a (step S103). Accordingly, the light amount of the epi-illumination light source 109a or the transmitted-light illumination light source 111a can be instantly changed to a desired value. In this case, the observer has already been observing the specimen SP while adjusting the light amount. Therefore, fast response of the volume operation unit 41 of the operation device 4 is required. After step S103, the microscope system 1a is moved onto step S104 described below.

In step S102, when no volume operation is given to the volume operation unit 41 of the operation device 4 (No in step S102), the microscope system 1a is moved onto step S104 described below.

In step S104, when terminating the observation of the specimen SP (Yes in step S104), the microscope system 1a terminates the present processing. In contrast, when not terminating the observation of the specimen SP (No in step S104), the microscope system 1a is returned to step S101.

According to the above-described second embodiment of the present disclosure, the illumination control unit 54 controls the epi-illumination light source 109a or the transmitted-light illumination light source 111a by outputting, at fixed intervals, the light amount instruction value that instructs the light amount of the epi-illumination light source 109a or the transmitted-light illumination light source 111a to have the light amount according to the light control signal input from the operation device 4 within a predetermined time. Therefore, the rapid increase in the light amount despite the intention of the observer immediately after the power-up of the microscope system 1a can be prevented. Further, following that, when the volume operation is given to the volume operation unit 41 of the operation device 4, the illumination control unit 54 instantly changes the light amount according to the volume operation. Therefore, the responsiveness to the observer is not impaired, and thus operability can be improved.

Third Embodiment

Next, a third embodiment of the present disclosure will be described. A microscope system according to the third embodiment is different in the light control table stored in the light control table storage unit 531 according to the second embodiment and control performed by an illumination control unit. Therefore, hereinafter, the control performed by the illumination control unit according to the third embodiment will be described after description of a light control table stored in a light control table storage unit according to the third embodiment. Note that the same configuration as the microscope system 1a according to the second embodiment is denoted with the same reference sign, and description is omitted.

Figures 12, 13:
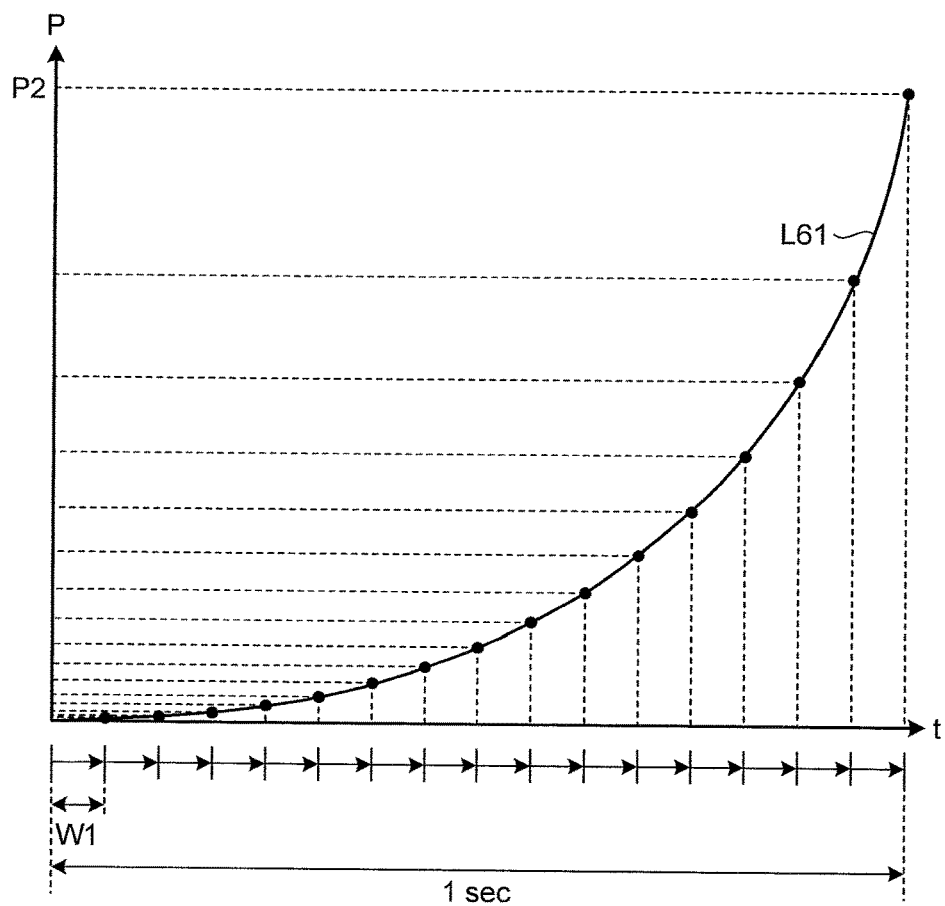
FIG. 12 is a diagram illustrating an example of a light control table stored in a light control table storage unit according to a third embodiment of the present disclosure.
FIG. 13 is a diagram schematically illustrating a light amount of an epi-illumination light source or a transmitted-light illumination light source controlled by an illumination control unit according to the third embodiment of the present disclosure.

FIG. 12 is a diagram illustrating an example of a light control table stored in a light control table storage unit 531 according to the third embodiment of the present disclosure. As illustrated in FIG. 12, in a light control table T2, a light amount instruction value P that instructs a light amount of an epi-illumination light source 109a or a transmitted-light illumination light source 111a for a light control signal N input from an operation device 4 is stored. To be specific, in the light control table T2, a value obtained by exponentiating the light control signal N input from the operation device 4 with a predetermined constant a is stored as the light amount instruction value P ($P=N^a$). For example, in a case where the light control signal N input from the operation device 4 is "3", the light amount instruction value P that instructs the light amount of the epi-illumination light source 109a or the transmitted-light illumination light source 111a is stored as "9" in the light control table T2 ($P=3^2$). The illumination control unit 54 controls the epi-illumination light source 109a or the transmitted-light illumination light source 111a with a current value equivalent to the light control instruction value corresponding to the light control signal (0 to 255 in FIG. 12) input from the operation device 4. In this case, the illumination control unit 54 controls the epi-illumination light source 109a or the transmitted-light illumination light source 111a to have the light amount according to the light control signal within a predetermined time (about one second) by outputting, at fixed intervals, the light amount instruction value that is exponentially and monotonously increased.

FIG. 13 is a diagram schematically illustrating the light amount of the epi-illumination light source 109a or the transmitted-light illumination light source 111a controlled by the illumination control unit 54. In FIG. 13, the horizontal axis represents a time and the vertical axis represents the light amount instruction value. Further, in FIG. 13, the curved line L61 illustrates the light amount instruction value for the light control signal input to the illumination control unit 54 from the operation device 4 immediately after start of the microscope system 1a.

As illustrated in the curved line L61 of FIG. 13, when the light control signal is input from the operation device 4 immediately after the start of the microscope system 1a, the illumination control unit 54 refers to the light control table T2 stored in the light control table storage unit 531, and controls the epi-illumination light source 109a or the transmitted-light illumination light source 111a to have the light amount instruction value P2 according to the light control signal in a predetermined time (about one second) by outputting, at fixed intervals, the light amount instruction value that is exponentially and monotonously increased. Accordingly, light control close to a characteristic of a halogen lamp can be performed.

According to the above-described third embodiment of the present disclosure, the illumination control unit 54 controls the light amount of the epi-illumination light source 109a or the transmitted-light illumination light source 111a to have the light amount according to the light control signal input from the operation device 4 by outputting, at fixed intervals, the light amount instruction value that is exponentially and monotonously increased to the epi-illumination light source 109a or the transmitted-light illumination light source 111a. Therefore, the rapid increase in the light amount despite the intention of the observer immediately after the power-up of the microscope system 1a can be prevented, and an enough time required for avoidance behavior or for light reflex can be made longer than the second embodiment.

Modification of Third Embodiment

Next, a modification of the third embodiment of the present disclosure will be described. The modification of the third embodiment has the same configuration as the third embodiment and is different in processing executed by an illumination control unit. Therefore, hereinafter, the processing executed by the illumination control unit of the modification of the third embodiment will be described. Note that the same configuration as the microscope system 1a according to the third embodiment is denoted with the same reference sign, and description is omitted.

Figure 14:
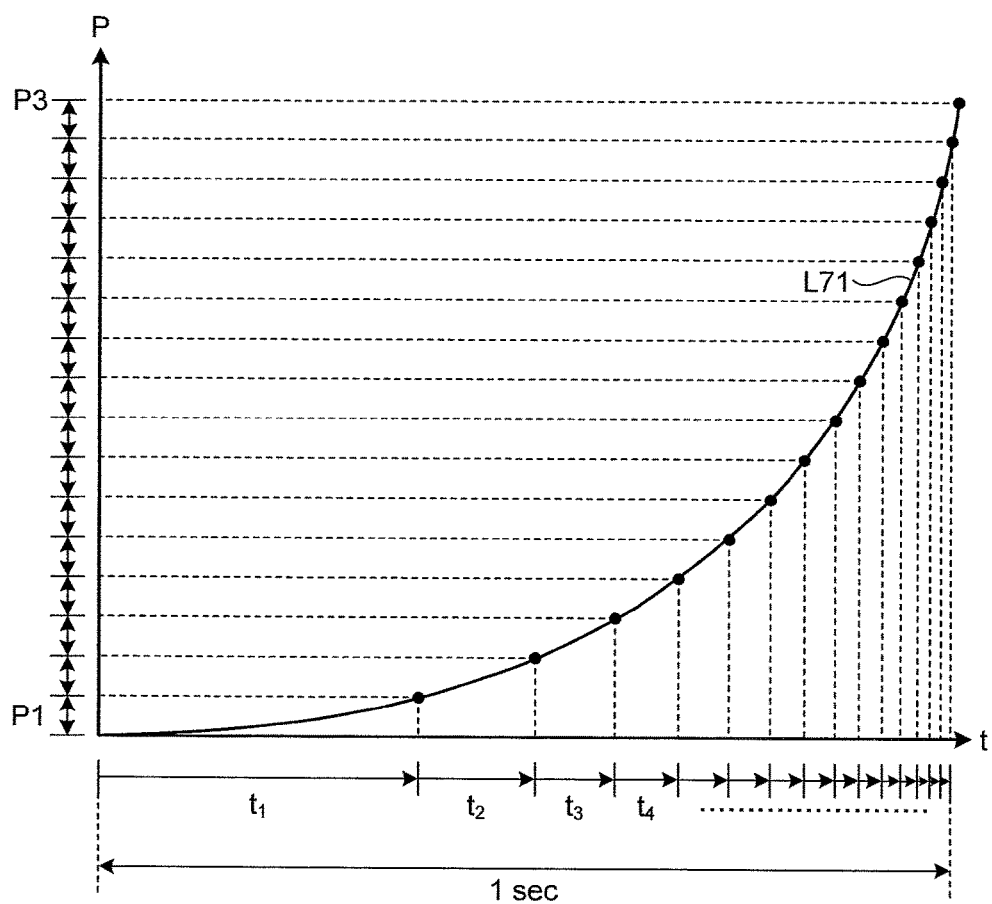
FIG. 14 is a diagram schematically illustrating a light amount of an epi-illumination light source or a transmitted-light illumination light source controlled by an illumination control unit according to a modification of the third embodiment of the present disclosure.

FIG. 14 is a diagram schematically illustrating a light amount of an epi-illumination light source 109a or a transmitted-light illumination light source 111a controlled by an illumination control unit 54. In FIG. 14, the horizontal axis represents a time and the vertical axis represents a light amount instruction value. Further, in FIG. 14, the curved line L71 illustrates a light amount instruction value for a light control signal input to an illumination control unit 54 from an operation device 4 immediately after start of a microscope system 1a.

As illustrated in the curved line L71 of FIG. 14, when the light control signal is input from the operation device 4 immediately after the start of the microscope system 1a, the illumination control unit 54 refers to a light control table T1 stored in a light control table storage unit 531 (see FIG. 9), and controls the epi-illumination light source 109a or the transmitted-light illumination light source 111a to have a light amount instruction value P3 according to the light control signal within a predetermined time by outputting an equally spaced light amount instruction value (P1) at monotonously decreased time intervals $(t_1 > t_2 > t_3 \ldots > t_n)$.

According to the above-described modification of the third embodiment of the present disclosure, the illumination control unit 54 controls the epi-illumination light source 109a or the transmitted-light illumination light source 111a to have the light amount according to the light control signal input from the operation device 4 by outputting, at monotonously decreased time intervals, an equally-spaced light amount instruction value that instructs the constant light amount in the epi-illumination light source 109a or the transmitted-light illumination light source 111a. Therefore, a rapid increase in the light amount despite the intention of an observer can be prevented, and an enough time required for avoidance behavior or for light reflex can be further made longer than the second embodiment.

Fourth Embodiment

Next, a fourth embodiment of the present disclosure will be described. A microscope system according to the fourth embodiment is different in a configuration from the microscope system 1a according to the third embodiment. Therefore, hereinafter, processing executed by a Microscope system according to the fourth embodiment will be described after description of the configuration of the microscope system according to the fourth embodiment. Note that the same configuration as the configuration of the microscope system 1a according to the third embodiment is denoted with the same reference sign, and description is omitted.

Configuration of Microscope System

Figure 15:
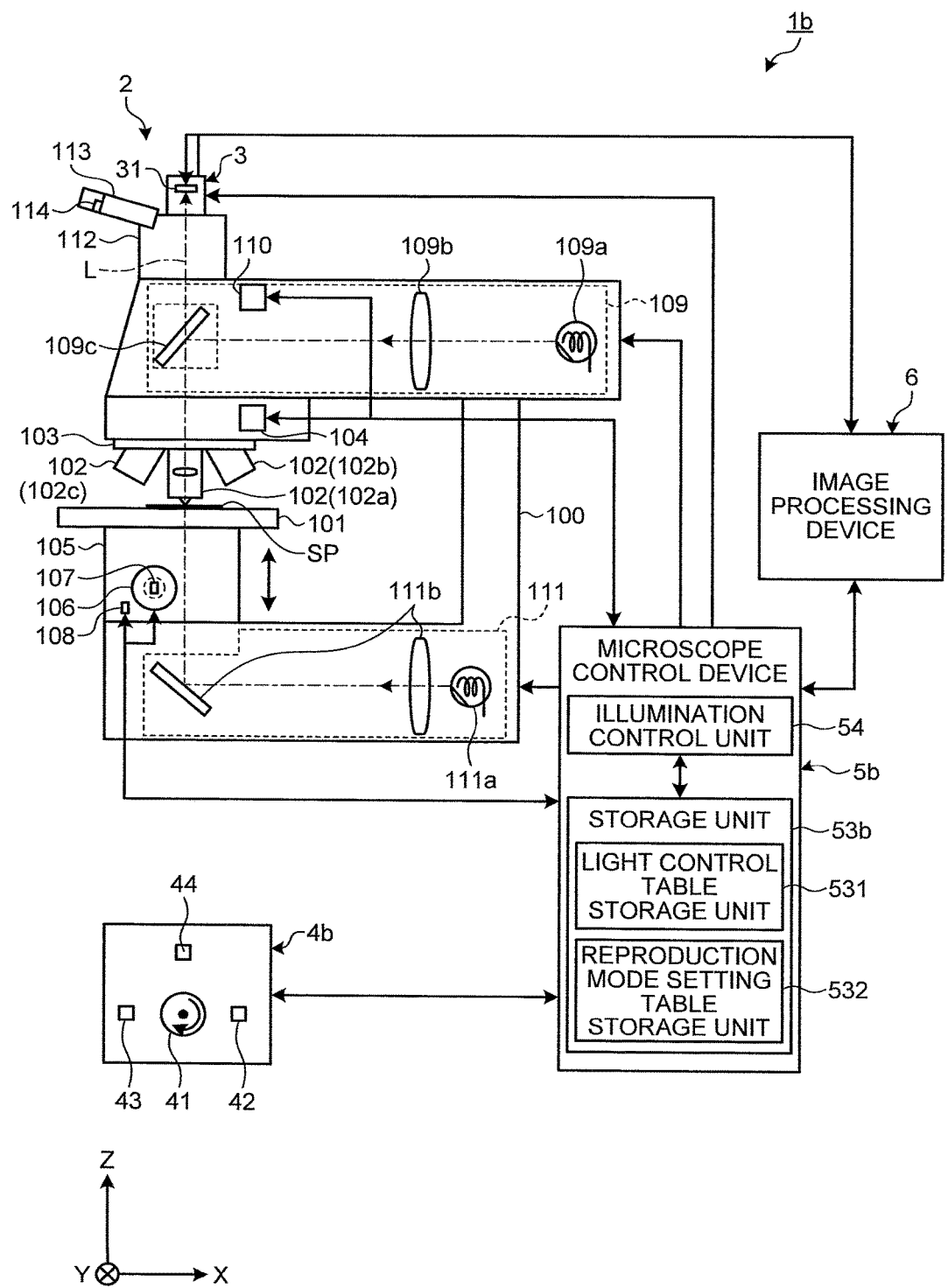
FIG. 15 is a schematic diagram illustrating schematic configuration of a microscope system according to a fourth embodiment of the present disclosure.

FIG. 15 is a schematic diagram illustrating a schematic configuration of a microscope system according to the fourth embodiment of the present disclosure. A microscope system 1b illustrated in FIG. 15 includes an operation device 4b and a microscope control device 5b in place of the operation device 4 and the microscope control device 5a of the microscope system 1a according to the third embodiment.

First, a configuration of the operation device 4b will be described. The operation device 4b includes a light amount setting switch 43 that receives inputs of instruction signals that store light control values of an epi-illumination light source 109a and a transmitted-light illumination light source 111a, and a mode switching switch 44 that receives an input of an instruction signal that switches a mode to a storage mode or a reproduction mode, in addition to the configuration of the operation device 4 of the third embodiment. Here, the storage mode is a mode to store the instruction signal to a reproduction mode setting table storage unit 532 of a storage unit 53b described below, in which a magnification of a present objective lens 102, a type of a cube 109c, and the light control value of the epi-illumination light source 109a or the transmitted-light illumination light source 111a are associated with one another, when the instruction signal that stores the light control value is input from a light amount setting switch 43 in a case where the microscope system 1b is in the storage mode. Further, the reproduction mode is a mode to control the epi-illumination light source 109a or the transmitted-light illumination light source 111a to have the light control value associated with the magnification of the present objective lens 102 and the type of the cube 109c based on the reproduction mode setting table stored in the reproduction mode setting table storage unit 532 described below.

Next, a configuration of the microscope control device 5b will be described. The microscope control device 5b includes a storage unit 53b in place of a storage unit 53a of the microscope control device 5a according to the third embodiment. The storage unit 53b includes a reproduction mode setting table storage unit 532 in addition to the configuration of the storage unit 53a according to the third embodiment. The reproduction mode setting table storage unit 532 stores the magnification of the objective lens 102, the type of the cube 109c, and the light control value of the epi-illumination light source 109a or the transmitted-light illumination light source 111a are stored in association with one another.

FIG. 16 is a diagram illustrating an example of a reproduction mode setting table stored in the reproduction mode setting table storage unit 532. As illustrated in FIG. 16, in a reproduction mode setting table T3, the magnification of the objective lens "50", the type of the cube "2", and the light control value N "100" are stored in association with one another.

In the microscope system 1b configured as described above, when the light control value N corresponding to the magnification of the present objective lens and the cube No is stored in the reproduction mode setting table T3 stored in the reproduction mode setting table storage unit 532 in a case where the instruction signal that instructs the reproduction mode is input from the mode switching switch 44, the illumination control unit 54 controls the epi-illumination light source 109a or the transmitted-light illumination light source 111a to have the light amount corresponding to the light control value N set in the reproduction mode setting table T3. Further, when the instruction signals that store the light control values of the epi-illumination light source 109a and the transmitted-light illumination light source 111a are input from the light amount setting switch 43 in a case where the instruction signal that instructs the storage mode is input from the mode switching switch 44, the microscope control device 5b stores the magnification of the present objective lens, the No of the cube, and the light control value of the epi-illumination light source 109a or the transmitted-light illumination light source 111a to the reproduction mode setting table storage unit 532 in association with one another.

Processing of Microscope System

Figure 17:
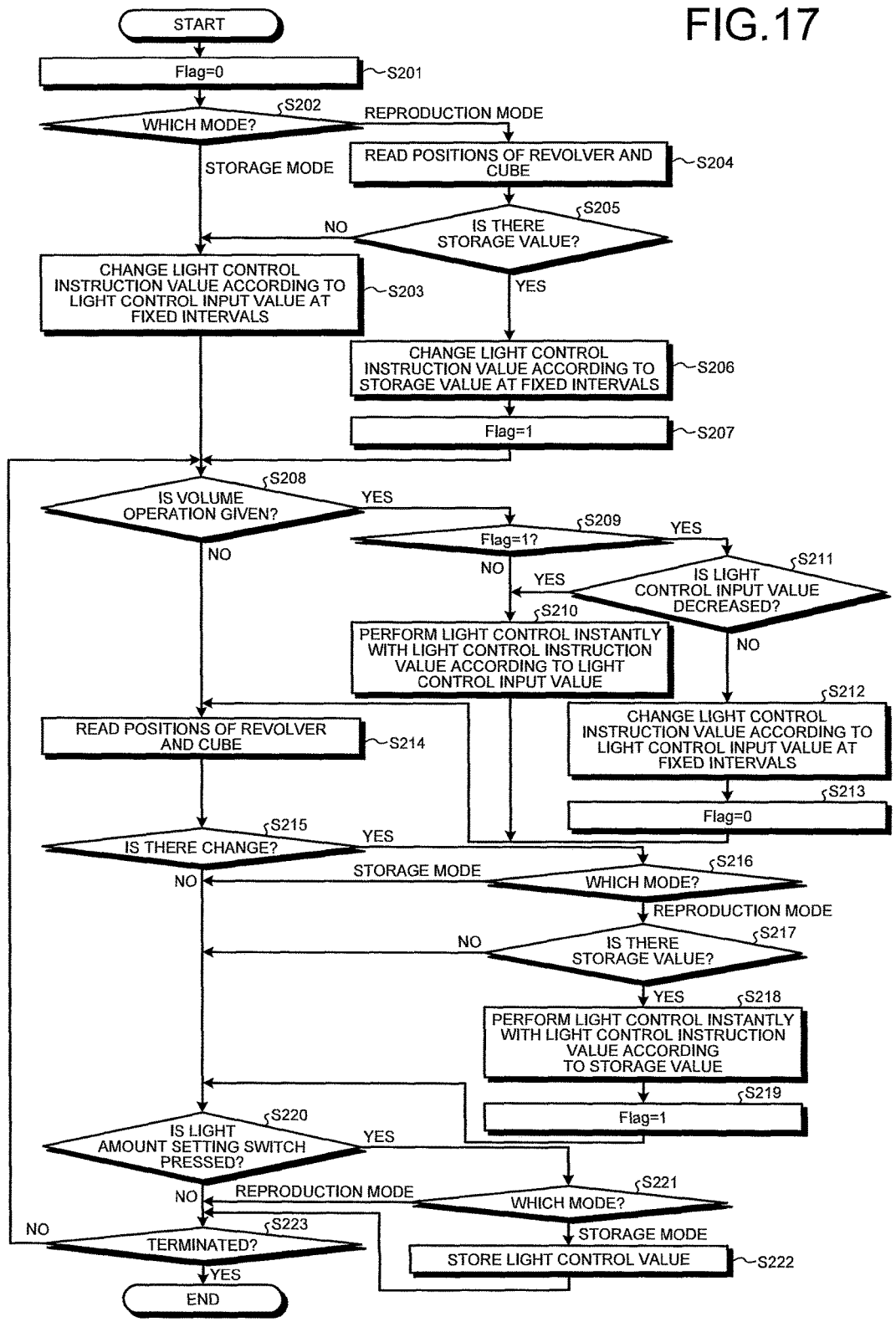
FIG. 17 is a flowchart illustrating an outline of processing executed by the microscope system according to the fourth embodiment of the present disclosure.

FIG. 17 is a flowchart illustrating an outline of processing executed by the microscope system 1b. As illustrated in FIG. 17, first, the microscope control device 5b initializes a flag that indicates a matching relationship between the light control value in the volume operation unit 41 of the operation device 4b and the light control value that is currently being output (Flag=0) (step S201).

Next, in the case where the mode of the microscope system 1b is the storage mode (step S202: storage mode), the illumination control unit 54 refers to a light control table T1 stored in the light control table storage unit 5 exponentially and monotonously increases, at fixed intervals, a light control input value up to the light control value input from the volume operation unit 41 of the operation device 4b, and outputs the light control input value to the epi-illumination light source 109a or the transmitted-light illumination light source 111a (step S203). After step S203, the microscope system 1a is moved onto step S208 described below.

In step S202, in the case where the mode of the microscope system 1b is the reproduction mode (step S202: reproduction mode), the microscope control device 5b reads respective positions of a revolver 103 and a cube 109c (step S204).

Following that, when there is a storage value of the light control value in the reproduction mode setting table storage unit 532 (Yes in step S205), the illumination control unit 54 refers to the reproduction mode setting table storage unit 532, and outputs the light control input value to the epi-illumination light source 109a or the transmitted-light illumination light source 111a while changing, at fixed intervals, the light control input value up to the storage value of the light control value according to the magnification of the objective lens 102 of the revolver 103 and the type of the cube 109c (step S206).

Following that, the illumination control unit 54 switches the flag that indicates the matching relationship between the light control value in the volume operation unit 41 of the operation device 4b and the light control value that is currently being output to "1" (Flag=1) (step S207), and the microscope system 1b is moved onto step S208 described below.

In step S205, when there is no storage value of the light control value in the storage unit 53b (No in step S205), the microscope system 1b is moved onto step S203.

In step S208, when a volume operation is given to the volume operation unit 41 of the operation device 4b (Yes in step S208), the microscope system 1b is moved onto step S209 described below. In contrast, when no volume operation is given to the volume operation unit 41 of the operation device 4b (No in step S208), the microscope system 1b is moved onto step S214 described below.

In step S209, in a case where the flag that indicates the matching relationship between the light control value in the volume operation unit 41 of the operation device 4b and the light control value that is currently being output is "1" (Flag=1) (Yes in step S209), the microscope system 1b is moved onto step S211 described below. In contrast, in a case where the flag is not "1" (Flag=0) (No in step S209), the microscope system 1b is moved onto step S210 described below.

In step S210, the illumination control unit 54 instantly controls the epi-illumination light source 109a or the transmitted-light illumination light source 111a to have the light control instruction value according to the light control input value input from the volume operation unit 41 of the operation device 4b (step S210). After step S210, the microscope system 1b is moved onto step S214 described below.

In step S211, in a case where the light control input value is decreased (Yes in step S211), the microscope system 1b is moved onto step S210. In contrast, in a case where the light control input value is not decreased (No in step S211), the microscope system 1b is moved onto step S212 described below.

In step S212, the illumination control unit 54 outputs the light control input value to the epi-illumination light source 109a or the transmitted-light illumination light source 111a while changing the light control input value up to the light control value at fixed intervals.

Following that, the illumination control unit 54 initializes the flag that indicates the matching relationship between the light control value in the volume operation unit 41 of the operation device 4b stored in the storage unit 53b and the light control value that is currently being input (Flag=0) (step S213). After step S213, the microscope system 1b is moved onto step S214 described below.

In step S214, the microscope control device 5b reads the respective positions of the revolver 103 and the cube 109c.

Following that, when the mode of the microscope system 1b is the storage mode (step S216: storage mode) in a case where the respective positions of the revolver 103 and the cube 109c are changed (Yes in step S215), the microscope system 1b is moved onto step S219 described below. In contrast, when the mode of the microscope system 1b is the reproduction mode (step S216: reproduction mode) in a case where the respective positions of the revolver 103 and the cube 109c are changed (Yes in step S215), the microscope system 1b is moved onto step S217 described below.

In step S215, in a case where the respective positions of the revolver 103 and the cube 109c are not changed (No in step S215), the microscope system 1b is moved onto step S220 described below.

In step S217, in a case where there is a storage value of the light control value in the storage unit 53b (Yes in step S217), the illumination control unit 54 instantly controls the epi-illumination light source 109a or the transmitted-light illumination light source 111a up to the storage value of the light control value (step S218).

Following that, the illumination control unit 54 switches the flag that indicates the matching relationship between the light control value in the volume operation unit 41 of the operation device 4b and the light control value that is currently being output to "1" (Flag=1) (step S219). After step S219, the microscope system 1b is moved onto step S220 described below.

In step S217, in a case where there is no storage value of the light control value in the storage unit 53b (No in step S217), the microscope system 1b is moved onto step S220.

In step S220, when the light amount setting switch 43 of the operation device 4b is pressed (Yes in step S220), the microscope system 1b is moved onto step S221 described below. In contrast, when the light amount setting switch 43 of the operation device 4b is not pressed (No in step S220), the microscope system 1b is moved onto step S223 described below.

In step S221, in a case where the mode of the microscope system 1b is the reproduction mode (step S221: reproduction mode), the microscope system 1b is moved onto step S223 described below. In contrast, in a case where the mode of the microscope system 1b is the storage mode (step S221: storage mode), the illumination control unit 54 stores the magnification of the present objective lens 102, the type of the cube 109c, and the light control value to the reproduction mode setting table storage unit 532 in association with one another (step S222). After step S222, the microscope system 1b is moved onto step S223.

In step S223, in a case where the microscope system 1b terminates observation of a specimen SP (Yes in step S223), the microscope system 1b terminates the processing. In contrast, in a case where the microscope system 1b does not terminate the observation of the specimen SP (No in step S223), the microscope system 1b is returned to step S208.

According to the fourth embodiment of the present disclosure, the illumination control unit 54 controls the epi-illumination light source 109a or the transmitted-light illumination light source 111a while increasing, at fixed intervals, the light amount of the epi-illumination light source 109a or the transmitted-light illumination light source 111a to have the light amount according to the light control signal input from the operation device 4b or the light control value stored in the storage unit 53a, immediately after the power-up of the microscope system 1b. Therefore, a rapid increase in the light amount despite the intention of the observer due to causes such as a case where the volume is larger than necessary at the time of the power-up of the microscope system 1b or case where a large light amount more than necessary is set in the reproduction mode can be prevented.

Further, according to the fourth embodiment of the present disclosure, in a case where the microscope system 1b outputs the light control value stored in the reproduction mode when and after the light control immediately after the power-up of the microscope system 1b is performed, the illumination control unit 54 changes, at fixed intervals, the light amount of the epi-illumination light source 109a or the transmitted-light illumination light source 111a to have the light amount according to the light control value when the volume operation is first operated to the operation device 4b, whereby the rapid increase in the light amount despite the intention of the observer can be prevented.

Further, according to the fourth embodiment of the present disclosure, in the case where the mode of the microscope system 1b is the reproduction mode when and after the light control immediately after the power-up of the microscope system 1b is performed, when there is no volume operation to the operation device 4b, the revolver 103 and the cube 109c are changed, and the storage value according to the changed revolver 103 and cube 109c is stored in the storage unit 53b, the illumination control unit 54 instantly switches the light amount to become the light amount corresponding to the storage value stored in the storage unit 53b. Therefore, responsiveness to the observer is not impaired. Therefore, operability can be maintained.

Further, according to the fourth embodiment of the present disclosure, when the light control value corresponding to the light control signal input from the operation device 4 is decreased in the case where the mode of the microscope system 1a is the reproduction mode, even if the specimen to be observed by the observer becomes a dark state from a bright state, the observer does not feel dazzling. Therefore, the light amount of the epi-illumination light source 109a or the transmitted-light illumination light source 111a is instantly switched to the light amount corresponding to the light control signal input from the operation device 4. Therefore, the light amount can be switched without impairing the responsiveness.

Other Embodiments

Further, in the first to fourth embodiments of the present disclosure, when a light control signal is input from an operation device, in a case where touch from an outside is detected by a touch sensor and proximity of an object is detected by a proximity sensor, that is, in a case where observation of a specimen by an observer is detected, a light amount of an epi-illumination light source or a transmitted-light illumination light source may be controlled to become a light amount according to the light control signal after lapse of a predetermined time. Apparently, in a case where touch from an outside is not detected by a touch sensor and proximity of an object is not detected by a proximity sensor, for example, in a case where observation of a specimen by imaging with an imaging device is performed, an illumination control unit may control the light amount of the epi-illumination light source or the epi-illumination light source to become a light amount according to the light control signal input from the operation device.

Further, in the first to fourth embodiments of the present disclosure, the illumination control device has controlled the light amount of the epi-illumination light source or the transmitted-light illumination light source to become the light amount according to the light control signal after lapse of a predetermined time in a case where the light control signal is input from the operation device. However, the above-described predetermined time may be appropriately changed through an input interface such as a keyboard of an image processing device (not illustrated). To be specific, a time (one second or more) exceeding a light reflex time is favorable.

Further, in the first to fourth embodiments of the present disclosure, the description has been given where the light amount instruction value is a value equivalent to a drive current value in continuous lighting. However, the epi-illumination light source or the epi-illumination light source may be PWM lighting, and a duty ratio in the PWM lighting may be used as the light control instruction value.

In the present disclosure, a microscope system including a microscope device, an imaging device, and a microscope control device has been exemplarily described. However, the present disclosure can be applied to an imaging device, for example, a video microscope, or the like, which has an objective lens that enlarges a specimen, an imaging function to image the specimen through the objective lens, and a display function to display an image.

Note that, in the description of the flowcharts in the present specification, the context of the processing among the steps has been explicitly described using the expressions such as "first", "following that", and "next". However, the order of the processing necessary for implementing the present disclosure is not uniquely determined by the expressions. That is, the order of the processing in the flowcharts described in the present specification can be changed without inconsistency.

According to the present disclosure, an effect to prevent a rapid increase in the light amount despite the intention of an observer is exerted.

Additional advantages and modifications will readily occur to those skilled in the art. Therefore, the disclosure in its broader aspects is not limited to the specific details and representative embodiments shown and described herein.

What is claimed is:
1. A microscope system comprising:
a stage configured to have a specimen placed thereon;
a light emitting diode configured to emit illumination light for illuminating the specimen;
an optical system configured to condense the illumination light emitted by the light emitting diode and irradiate the specimen with the illumination light;

an input unit configured to receive an input of a light control signal that adjusts a light amount of the light emitting diode; and a control unit configured to:

determine whether the light control signal instructs to decrease or increase the light amount of the light emitting diode, when the light control signal instructs to decrease the light amount of the light emitting diode, control the light amount of the light emitting diode to instantly have a value according to the light control signal, and when the light control signal instructs to increase the light amount of the light emitting diode, select a predetermined time from among a plurality of values to control the light amount of the light emitting diode to become a light amount according to the light control signal by delaying the light control signal by the predetermined time from a timing when the light control signal is input, by changing the light amount of the light emitting diode to become the light amount according to the light control signal in a stepwise manner within the predetermined time.

2. The microscope system according to claim 1, wherein the control unit starts to control the light amount of the light emitting diode when the microscope system is powered up.

3. The microscope system according to claim 1, wherein the control unit controls the light emitting diode by exponentially and monotonously increasing and outputting, at fixed time intervals, a light amount instruction value that indicates the light amount of the light emitting diode such that the light amount instruction value reaches the light amount according to the light control signal within the predetermined time.

4. The microscope system according to claim 1, wherein the control unit controls the light emitting diode by outputting at monotonously decreasing time intervals, an equally-spaced light amount instruction value that instructs the light amount of the light emitting diode to reach the light amount according to the light control signal within the predetermined time.

5. The microscope system according to claim 3, further comprising:

a storage unit configured to store the light amount instruction value when the microscope system is powered up, wherein the control unit controls the light amount of the light emitting diode to become the light amount according to the light control signal after lapse of the predetermined time when the light amount of the light emitting diode according to the light control signal is larger than the light amount of the light emitting diode according to the light amount instruction value stored in the storage unit.

6. The microscope system according to claim 1, wherein the input unit receives an input of an instruction signal that instructs change of the predetermined time.

7. The microscope system according to claim 1, further comprising:

a detection unit configured to detect whether an observer is observing the specimen, wherein the control unit controls the light amount of the light emitting diode when the detection unit detects that the observer is observing the specimen.

8. The microscope system according to claim 1, wherein the predetermined time is in a range of from 0.5 to 3 seconds.

9. The microscope system according to claim 1, wherein the predetermined time is in a range of from 1 to 2 seconds.

10. The microscope system according to claim 1, wherein the predetermined time is 1 second.

\* \* \* \* \*